US012602493B2

(12) United States Patent
Waneck

(10) Patent No.: US 12,602,493 B2
(45) Date of Patent: Apr. 14, 2026

(54) COMPUTER-IMPLEMENTED METHOD AND COMPUTER PROGRAM PRODUCT FOR THE ACCESS CONTROL OF A TERMINAL

(71) Applicant: PP Corporate AG, Pfäffikon (CH)

(72) Inventor: Peter Waneck, Oberaegeri (CH)

(73) Assignee: PP CORPORATE AG, Pfäffikon (CH)

( * ) Notice: Subject to any disclaimer, the term of this patent is extended or adjusted under 35 U.S.C. 154(b) by 214 days.

(21) Appl. No.: 16/623,359

(22) PCT Filed: Jun. 15, 2018

(86) PCT No.: PCT/EP2018/065931
§ 371 (c)(1),
(2) Date: Dec. 16, 2019

(87) PCT Pub. No.: WO2018/229246
PCT Pub. Date: Dec. 20, 2018

(65) Prior Publication Data
US 2020/0184088 A1 Jun. 11, 2020

(30) Foreign Application Priority Data

Jun. 16, 2017 (EP) ..................................... 17176421

(51) Int. Cl.
G06F 21/60 (2013.01)
G06F 21/32 (2013.01)
G06V 40/16 (2022.01)

(52) U.S. Cl.
CPC ............ G06F 21/604 (2013.01); G06F 21/32 (2013.01); G06V 40/161 (2022.01); G06F 2221/2147 (2013.01); G06F 2221/2149 (2013.01)

(58) Field of Classification Search
CPC ................... G06F 21/604; G06F 21/32; G06F 2221/2149; G06F 2221/2141
See application file for complete search history.

(56) References Cited

U.S. PATENT DOCUMENTS

| | | | |
|---|---|---|---|
| 8,370,639 | B2 | 2/2013 | Azar et al. |
| 8,660,322 | B2 | 2/2014 | Tsai et al. |

(Continued)

FOREIGN PATENT DOCUMENTS

| | | |
|---|---|---|
| EP | 1703431 A2 | 9/2006 |
| EP | 2927835 A1 | 10/2015 |

(Continued)

OTHER PUBLICATIONS

Sophie Weib, Confidential Desktop Towards an access control framework for preserving data confidentiality based on environmental conditions Diploma Thesis, published Dec. 17, 2015 by Vienna University of Technology pages xi, 1-2, 42-43 (Year: 2015).*

(Continued)

*Primary Examiner* — Ellen Tran
(74) *Attorney, Agent, or Firm* — McCoy Russell LLP

(57) ABSTRACT

The invention relates to a computer-implemented method and to a computer program product for the access control of a terminal, private data and other data being stored on the terminal and access to the private data being able to be limited or unlimited, comprising the following steps in the case of unlimited access: capturing an image signal by means of a camera of the terminal; performing a face detection process by means of the captured image signal; and continuously monitoring the number of faces in the captured image signal, which number of faces is determined in the face detection process, the access being limited if the number of faces is greater than one.

6 Claims, 5 Drawing Sheets

(56) References Cited

U.S. PATENT DOCUMENTS

| | | | | |
|---|---|---|---|---|
| 9,898,619 | B1* | 2/2018 | Hadsall | G06F 21/60 |
| 2006/0210167 | A1* | 9/2006 | Inoue | G06F 21/32 382/190 |
| 2010/0124363 | A1* | 5/2010 | Ek | G06F 21/6245 382/118 |
| 2010/0205667 | A1 | 8/2010 | Anderson et al. | |
| 2013/0318589 | A1* | 11/2013 | Ford | H04L 63/0428 726/7 |
| 2015/0326570 | A1* | 11/2015 | Publicover | H04N 5/44504 726/4 |
| 2016/0012218 | A1 | 1/2016 | Perna et al. | |
| 2017/0046507 | A1 | 2/2017 | Archer et al. | |

FOREIGN PATENT DOCUMENTS

| | | |
|---|---|---|
| RU | 2338258 C2 | 11/2008 |
| RU | 2558617 C2 | 8/2015 |

OTHER PUBLICATIONS

ISA European Patent Office, International Search Report Issued in Application No. PCT/EP2018/065931, Jul. 12, 2018, WIPO, 6 pages.

Federal Service for Intellectual Property, Office Action and Search Report Issued in Application No. 2020101280/28 (001850), Nov. 24, 2020, 10 pages. (Submitted with Partial Translation).

Rospatent Federal Service for Intellectual Property, Examination Report Issued in Application No. 2020101280, Dec. 7, 2022, 13 pages.

Chen, J. et al., "Computer network application basics," Tsinghua University Press, Hai Dian Qu, Bei Jing Shi, China, Apr. 15, 2011, 375 pages. (Submitted with Partial Machine Translation).

"Baidu Reading One-Month VIP Web Page and Mobile APP Simple Experience Evaluation," SMZDM Website, Available Online at https://post.smzdm.com/p/aw3n75wm/, Jul. 23, 2014, 24 pages. (Submitted with Machine Translation).

Liu, J. et al., "Interpretation of cultural industry management cases," Communication University of China Press, First Edition, Available as Early as Jan. 30, 2015, 190 pages.

"How to enter the VIP area of iReader to view exclusive free books," Baidu Website, Available Online at https://jingyan.baidu.com/article/20095761bdb85ecb0721b4c4.html, May 8, 2015, 4 pages. (Submitted with Machine Translation).

"Can anyone tell me what's wrong? I am a VIP and have already watched episode 9. Why does it always show data errors," Baidu Website, Available Online at https://zhidao.baidu.com/question/2139637736460320508.html, Jul. 4, 2015, 4 pages. (Submitted with Machine Translation).

Weiss, S., "Confidential desktop: towards an access control framework for preserving data confidentiality based on environmental conditions," Diploma Thesis in Media Informatics, Institute for Software Engineering and Interactive Systems, Vienna University of Technology, 2015, 99 pages.

China National Intellectual Property Administration, Office Action and Search Report Issued in Application No. 201880052874.8, Feb. 23, 2024, 78 pages. (Submitted with Partial Translation).

* cited by examiner

COMPUTER-IMPLEMENTED METHOD AND COMPUTER PROGRAM PRODUCT FOR THE ACCESS CONTROL OF A TERMINAL

CROSS-REFERENCE TO RELATED APPLICATIONS

The present application is a U.S. National Phase of International Patent Application Serial No. PCT/EP2018/065931 entitled "COMPUTER-IMPLEMENTED METHOD AND COMPUTER PROGRAM PRODUCT FOR THE ACCESS CONTROL OF A TERMINAL," filed on Jun. 15, 2018. International Patent Application Serial No. PCT/EP2018/065931 claims priority to European Patent Application No. 17176421.0 filed on Jun. 16, 2017. The entire contents of each of the above-referenced applications are hereby incorporated by reference for all purposes.

TECHNICAL FIELD

The invention relates to a computer-implemented method for the access control of a terminal, private data and other data being stored on the terminal and access to the private data being able to be limited or unlimited, comprising the following steps in the case of unlimited access: capturing an image signal by means of a camera of the terminal and performing a face detection process by means of the captured image signal.

BACKGROUND AND SUMMARY

The terminal can be a computer, a terminal device, in particular, a mobile terminal, e.g. a smartphone or a tablet computer. In this connection, private data include data that are marked as private, stored on the terminal or received and intermediately stored by the terminal. For example, a contact from an address book of a smartphone can be marked as private (a private contact) and, by means of this, all the data associated with the contact marked as private (e.g. contact information, chat displays, call signalling, location, etc.) are also automatically marked as private. Typically, such private data are locally stored on the terminal and are fully encrypted. This can make it difficult to bypass the access control or avoid this.

In this connection, a face detection process is understood as a known image analysis method. Such methods are frequently used for localizing a face in an image (face localization) in the case of digital camera for example. In this connection, the position of the faces is only of minor importance. The face detection process essentially designates an automatic detection (in terms of a determination, not an identification) of one or a plurality faces in an image. The normally is made possible on the basis of movement, typical shapes (oval) and colours (skin pigments) and/or detection and evaluation of the arrangement and distance of the eyes. In contrast to this, face identification relates to an assignment of a face to a certain person. Face identification is a biometric method and can, for example, be used as a biometric factor for the authentication of people. Thereby, for example, biometric features of a face are compared with the stored features of a known face and the identity of the person is confirmed in the event of a match. The term face detection can mean both a face detection process as well as face identification and will therefore be avoided to a great extent in the following.

The access control essentially controls what data a user has access to and, in particular, what data are visible for the user in general. A typical access control system differentiates between a blocked access (access deactivation), which is characterized in that the blocked data are not visible, and unlimited access. The access deactivation can, for example, be a screen lock, which can only be cancelled by means of an authentication of the user. In the case of access deactivation, the access to all data (i.e. private and other data) is blocked on the terminal. Accordingly, in the case of an active access deactivation, none of the data stored on the terminal are generally visible. In any case, access to public status information (e.g. time, received signal, etc. are displaced despite an active access deactivation, thereby being visible).

Such an access control is known from U.S. Pat. No. 8,370,639 B2 for example. In it, a method for authentication and continuous tracking of a user (e.g. of a mobile telephone) by means of face recognition is described. The face recognition can be initialized by entering other authentication characteristics, for example, of a password. However, in the case of this access control, no differentiation is made between blocked and limited or between limited and unlimited access: as soon as and as long as a user can be authenticated, there is unlimited access. A second user, which stays in the vicinity of the terminal thereby receives essentially the same unlimited access as the authorized user. In particular, all displayed data can be read by others.

A similar method is also shown in U.S. Pat. No. 8,660,322 B. In the case of this method, access is blocked if the user leaves the field of view of a camera; as soon as he/she is detected again, unlimited access is granted again. Also here, no limited access is provided.

It is the object of the invention to protect private data from being spied on and read by others.

In the case of the method of the aforementioned type according to the invention, the number of faces detected in the detected image signal during the face detection process is continuously monitored, wherein access is limited if the number of faces is greater than one. Thereby, it can be ensured that the unlimited access is only granted for as long as only one person is detected in the field of view of the camera (i.e. the region that the camera detects). As soon as the face of a second person enters into the field of view of the camera, the access is limited, meaning the terminal is changed over to limited access. Afterwards, the users of the terminal continue to have access to the other data that are not marked as private that are stored on the terminal. In this way, it is made difficult for a second person to spy on the private data. For example, private contacts and all indications of the communication with private contacts are kept confidential from other people than the authorized user of the terminal. The marking of data as private is carried out by the user and is stored on the terminal. For example, the user can mark an existing contact as "private" or he/she creates a new contact with the indication "private" or he/she creates a new contact with the indication "private". Subsequently, the terminal treats all data linked to this contact as private data, e.g. earlier calls, text messages, e-mails, chat messages, the contact information itself or images or videos liked to the contact.

If the terminal comprises a screen for displaying private and other data, it is particularly favourable if the private data are fully hidden in the case of limited access and only the other data are displayed. That means the access to the private data is not only limited by making it unidentifiable, but in a way that, in the case of limited access, no indication of the existence of this data is evident. In particular, unauthorized users should not recognize that thy only have limited access.

In this connection, it has been shown to be favourable if, in the case of unlimited access, a visual indication of unlimited access is displayed. Thereby, in the case of unlimited access, a user can recognize that, now, both other data as well as private data are displayed and that he/she thereby has fully free access to all data. The visual indication can, for example, be a green frame on the screen. An unlimited access can be recognized by the authorized user by the visual indication not being present; the limited access cannot be recognized by the non-authorized user however, because this user does not know or expect the visual indication.

Preferably, in the case of limited access, events pertaining to private data are displayed on the screen in a limited (e.g. censored) form. This function should make it possible for events in connection with private data (e.g. a message from a private contact) to be pointed out to the user even in the case of limited access (e.g. if the terminal is not used or is not used alone). For example, a call from a private contact can be displayed as an "unknown number" if a smartphone openly lies on the table for example.

With regard to starting continuous analysis, it is favourable if an authentication of a user is performed in order to obtain unlimited access, wherein, before the unlimited access is granted, an image signal is captured using the camera of the terminal, a face detection process is carried out with the captured image signal and a determination of the number of faces in the captured image signal are carried out, wherein the granting of access only takes place if the number of faces is exactly one. Even in the event of successful authentication, unlimited access is only granted if no observers and potential co-readers are detected.

In this context, it is particularly favourable if authentication includes biometric authentication, in particular, face identification and/or iris identification. In this case, authentication and the number of faces can be performed on the basis of the same image data. In addition or as an alternative, other factors can of course also be used for authentication, e.g. a password or a fingerprint.

In a preferred variant of the present invention, the face identification can be repeated regularly or randomly in parallel with the analysis of the number of faces. This makes it possible to ensure that an unauthorized user who appears in the camera's field of view at the same time the authorized user leaves the camera's field of view has unlimited access.

BRIEF DESCRIPTION OF THE FIGURES

The invention is explained below on the basis of particularly preferred exemplary embodiments, to which it should not be limited, and will be further explained with reference to the drawings. In detail, the figures show.

DETAILED DESCRIPTION

Figure 1:
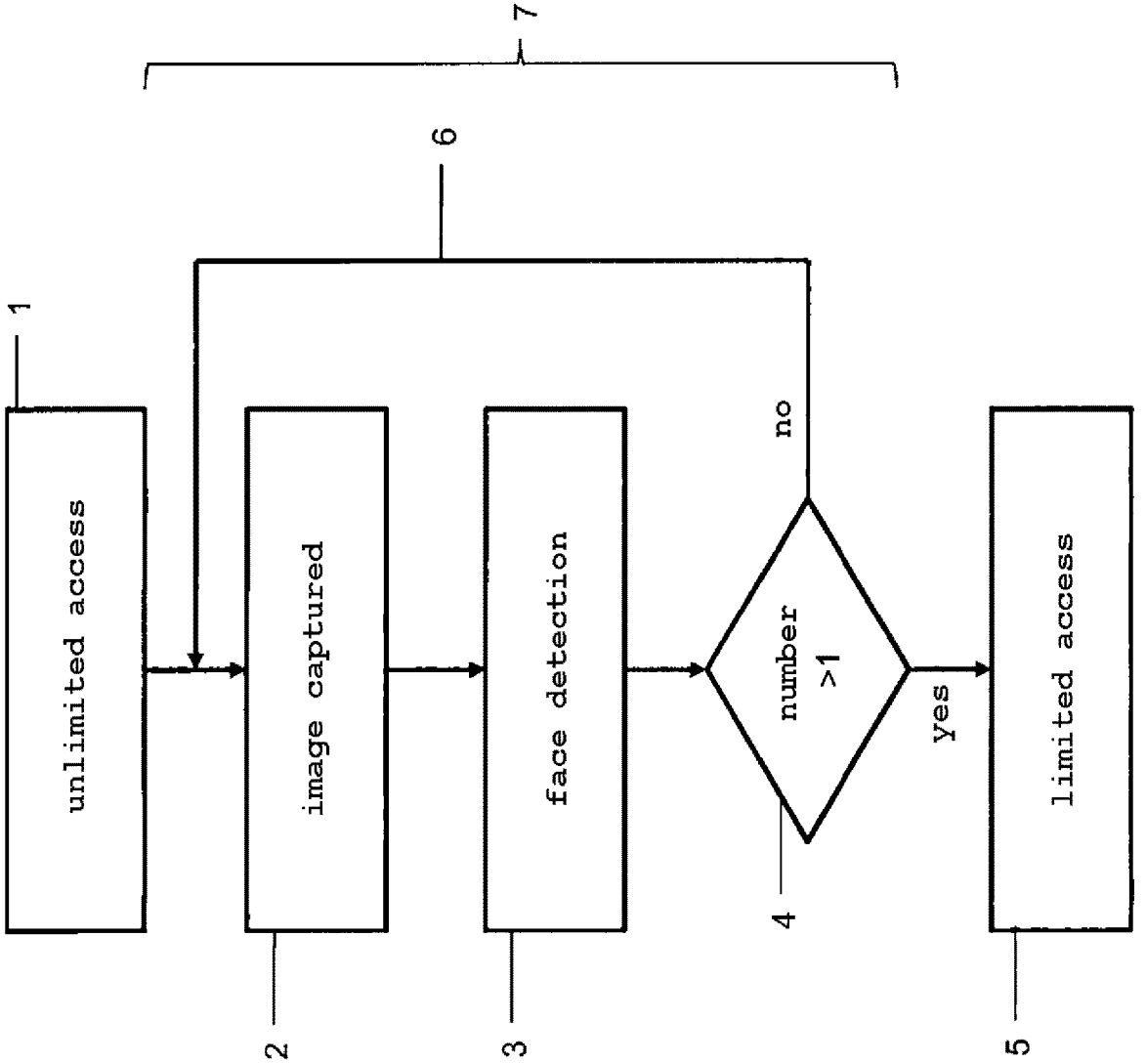
FIG. 1 schematically, the sequence of a simple variant of the method according to the invention.
Figure 3A:
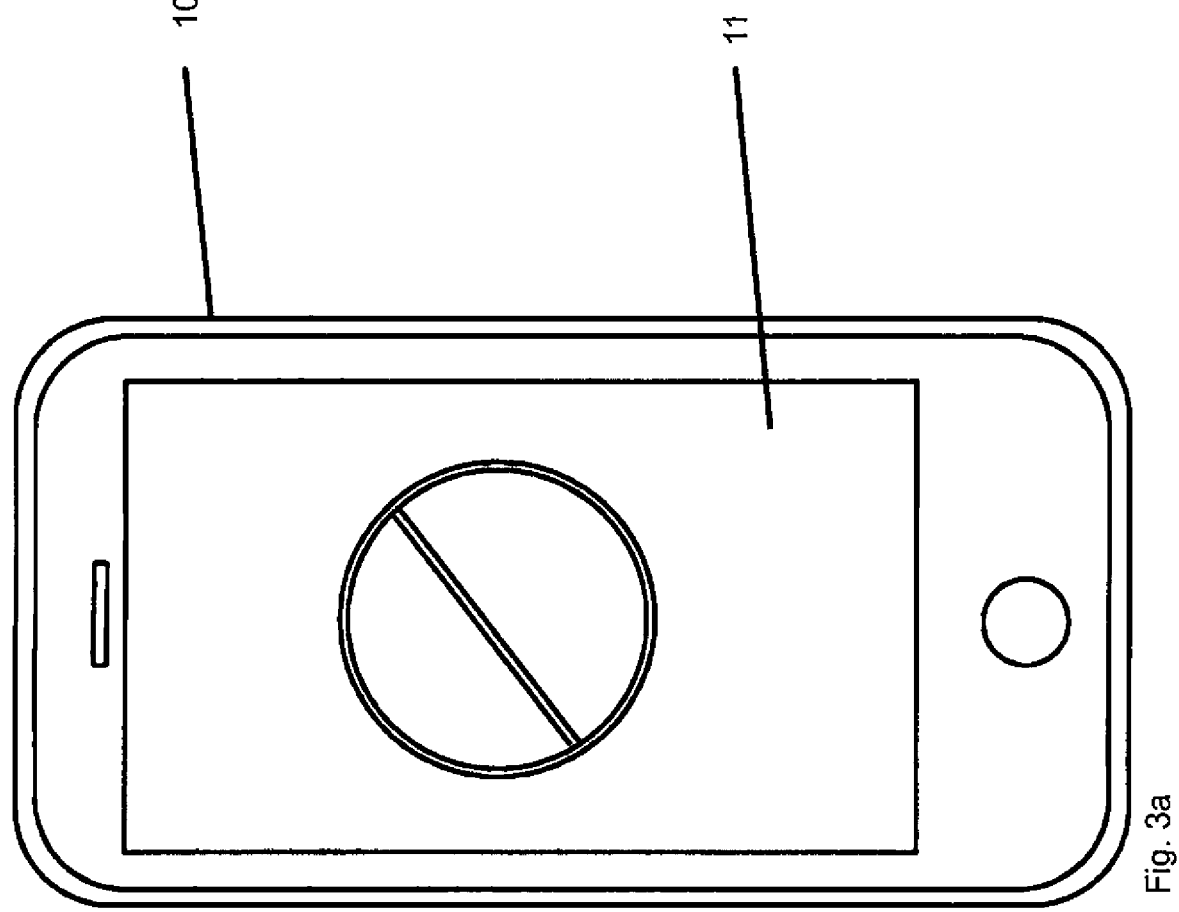
FIG. 3a schematically, a mobile terminal with blocked access.
Figure 3C:
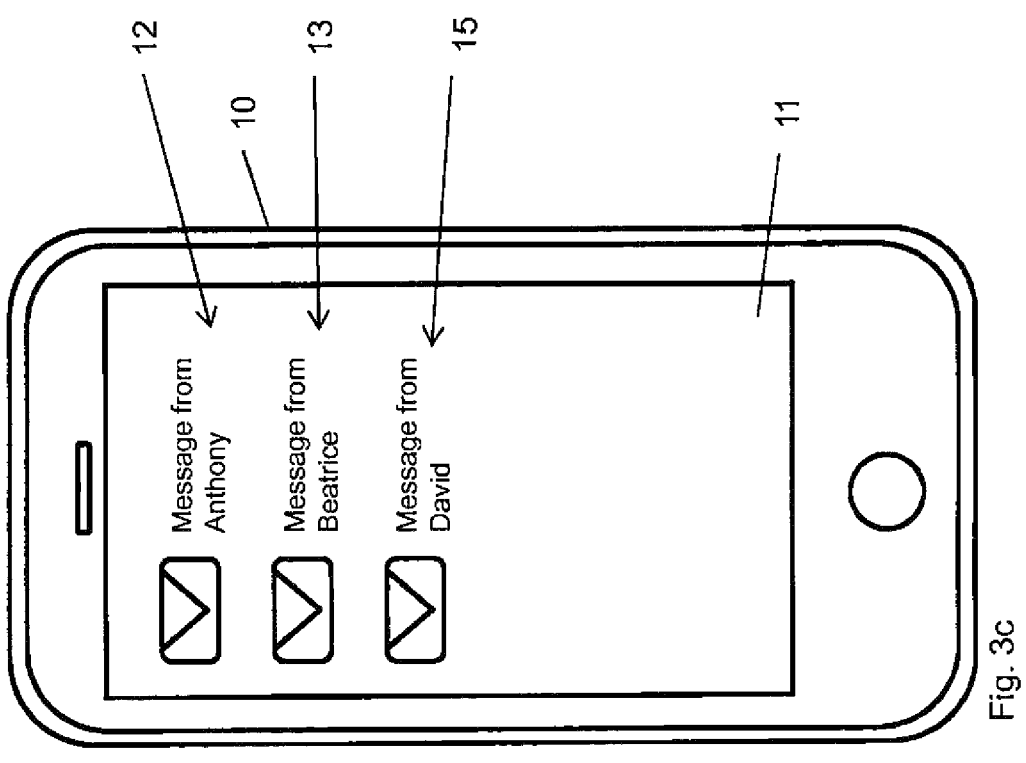
FIG. 3c schematically, a mobile terminal with limited access.
Figure 3B:
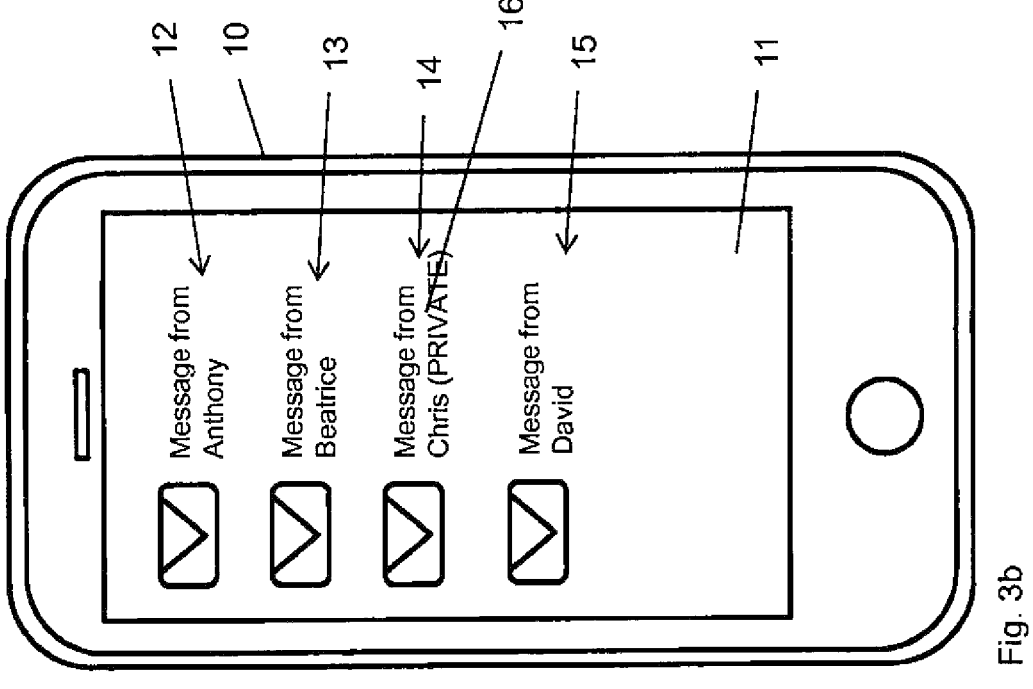
FIG. 3b schematically, a mobile terminal with unlimited access.

FIG. 1 shows the sequence of a computer-implemented method for the access control of a terminal (see FIG. 3a-c).

Private data and other data are stored on the terminal. Access to private data can be limited or unlimited.

On the basis of unlimited access 1 (cf. FIG. 3b), the method shown in FIG. 1 comprises the following steps, which are shown as a functional block. Initially, an image signal is captured 2 using a camera of the terminal (cf. FIG. 4a-b). Subsequently, a face detection process is performed using the captured image signal 3. After completing the face detection process, the number of faces detected during face detection process is analysed in the captured image signal 4. If the number of faces is greater than one (cf. FIG. 4b), access is limited 5 (cf. FIG. 3c). Otherwise 6, the next image signal is captured so that, during unlimited access, continuous monitoring 7 of the number of faces in the camera's field of view is performed. Once access is limited, the monitoring can be cancelled.

If the terminal comprises a screen for displaying private and other data, the private data are fully hidden in the case of limited access and only the other data are displayed. In the case of unlimited access, a visual indication of unlimited access is displayed on the screen in the form of a coloured (e.g. green) frame. Preferably, in the case of limited access, if an event pertaining to private data occurs, the event is displayed on the screen in a limited (e.g. censored) form.

Figure 2:
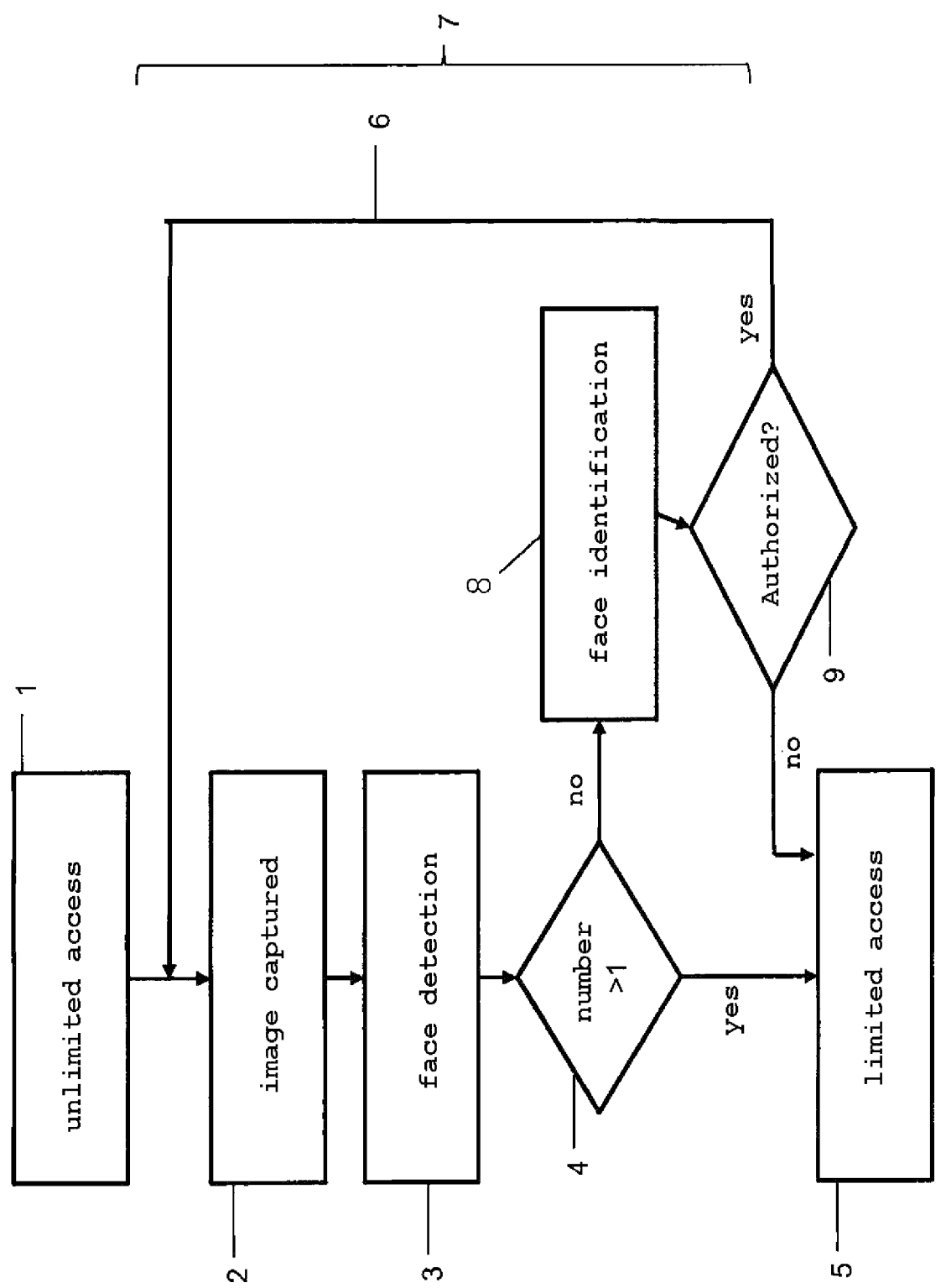
FIG. 2 schematically, the sequence of a simple variant of the method according to the invention.

FIG. 2 shows an enhanced variant of the method according to the invention. During monitoring 7, a face identification 8 is also carried out. The is followed by an analysis 9 of the user's authorization. If the user is not authorized, access is limited 5. The representation in FIG. 2 is simplified; the face identification 8 can be carried out, for example, only randomly or e.g. at every tenth pass of the analysis 7 in order to conserve the resources of the terminal (CPU time, battery).

In accordance with a further variant of the method according to the invention, a biometric authentication of a user using a face identification and, optionally, an iris identification can be carried out to obtain unlimited access. Before granting unlimited access, an image signal is captured using the camera of the terminal, a face detection process is carried out using the captured image signal and the number of faces in the captured image signal is determined. Subsequently, granting unlimited access only occurs if the number of faces is exactly one.

In FIG. 3a-c, the various states of a terminal 10 are shown, which can be taken in the context of the application of the method according to the invention. In this example, the terminal 10 is a smartphone with a screen 11. In FIG. 3a, the terminal 10 is shown with blocked access. On screen 11, a general icon is displayed, which symbolizes the access deactivation and makes it identifiable. In this state, access to the data stored on the terminal 10 is generally not granted; in particular, no personal data of a user of the device is displayed. At most, technical data (such as time, signal, network information, etc.) can be displayed. If an authorized user is authenticated, for example, by proving his/her identity and successful authentication has taken place, the terminal usually switches directly over to a state with unlimited access to all data stored on the terminal. This state is shown in FIG. 3b. In this state, on screen 11 of the terminal device 10 messages from four contacts, namely a first message 12 from the contact "Anthony", a second message 13 from the contact "Beatrice", a third message 14 from the contact "Chris" and a fourth message 15 of the Contact "David" are displayed. The contact "Chris" is marked as a private contact. The third message 14 is therefore shown with the visual indication 16 "PRIVATE"; the indication 16 allows the user of terminal 10 to recognize that unlimited access has been granted.

As soon as more than one face is detected in the image signal of a camera in the context of the method according to the invention carried out on the terminal 10, the terminal 10 switches over to a state with limited access. This state is shown in FIG. 3*c*. In this state, the first message 12, the second message 13, and the fourth message 15 are displayed. The third message 14 comes from the contact "Chris" marked as private and is therefore also marked as private and is therefore part of the private data. Accordingly, the limited access shown in FIG. 3*c* does not display any indication of the content or existence of the private third message 14. An observer who observes the screen 11 along with the user therefore does not come to the know the existence of the third message 14. Since the visual indication 16 is also hidden, the observer also cannot see that access is currently limited.

Figures 4A, 4B:
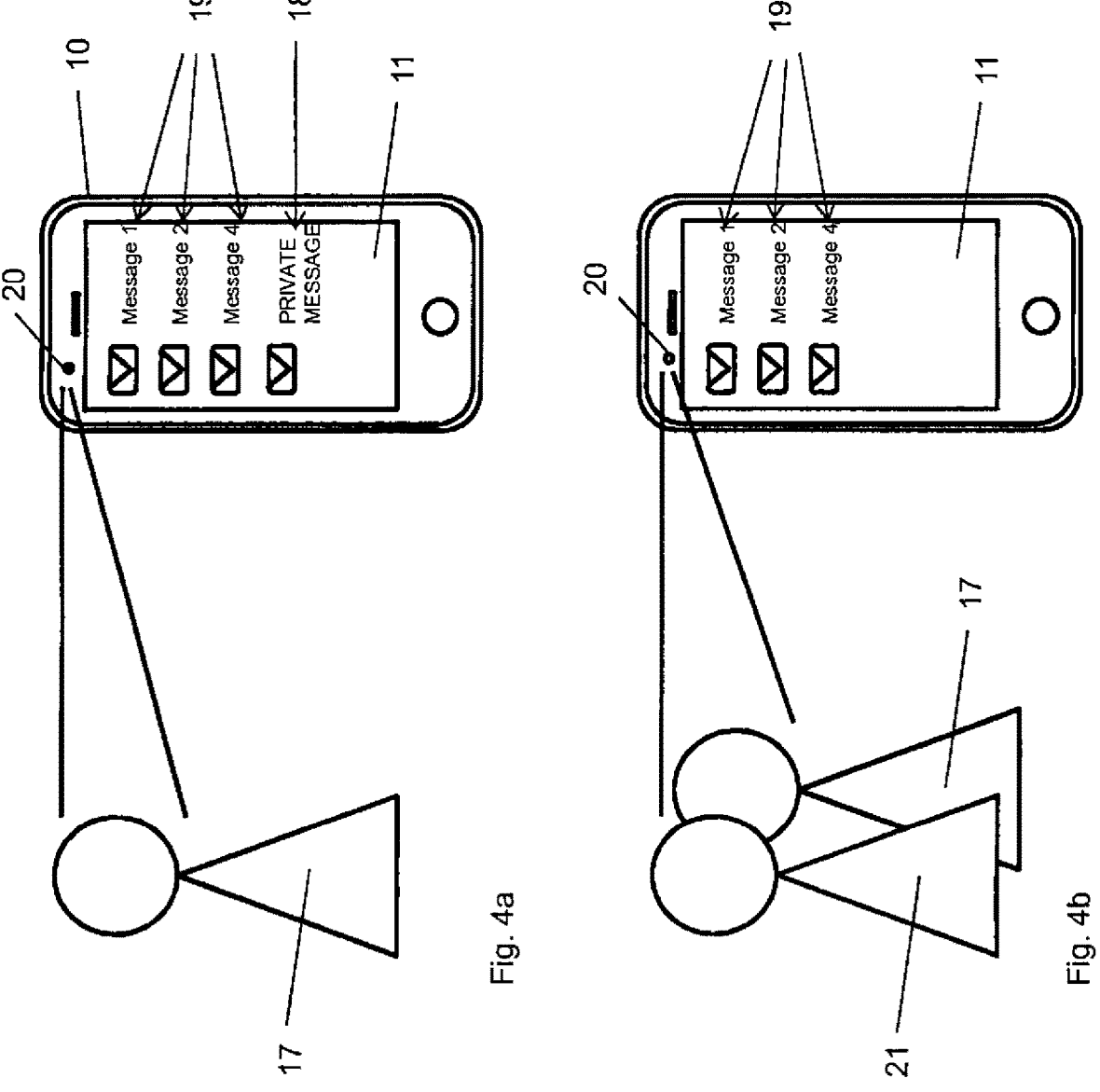
FIG. 4a schematically, a use case for unlimited access on a mobile terminal.
FIG. 4b, schematically, a use case for limited access on a mobile terminal.

FIGS. 4*a* and 4*b* show the use cases corresponding to the states in accordance with FIGS. 3*b* and 3*c*. In FIG. 4*a*, a first use case is shown, in which an authorized user 17 is using the terminal 10. The terminal 10 has already been unlocked and is in a state with unlimited access to private data 18 and other data 19. With a front camera 20 of the terminal 10, which is arranged on the same side as the screen 11, an image is repeatedly captured and the number of faces in the captured image is detected (cf. FIG. 1). In the first use case, only the authorized user 17 is in the field of view of the front camera 20 so that only one face is detected every time analysis takes place, thereby maintaining unlimited access.

A second use case is shown in FIG. 4*b*. An observer 21 steps to the side of the authorized user 17 and into the field of view of the front camera 20. The analysis immediately detects that the number of recognized faces is greater than one and puts the terminal 10 in the state with limited access (cf. FIG. 3*c*). Only the other data 19 are displayed on the screen. All private data 18 have been hidden from the display so their existence and content are hidden from the observer 21.

The invention claimed is:

1. A computer-implemented method for the access control of a terminal,
   wherein the terminal stores private data and other data and comprises a screen for displaying private data and other data,
   wherein access to the private data is unlimited,
   the computer-implemented method comprising the following steps:
   displaying a visual indication of unlimited access during unlimited access;

capturing an image signal with a camera of the terminal;
   performing a face detection process with the captured image signal;
   determining a number of faces detected in the captured image signal during the face detection process;
   limiting access to the private data responsive to determining that the number of faces is greater than one; and
   hiding the visual indication of unlimited access during limited access,
   wherein the private data are fully hidden during limited access and only the other data are displayed.

2. The method according to claim 1, further comprising the step of displaying events pertaining to private data on the screen in a limited form during limited access.

3. The method according to claim 1, during limited access comprising the steps of:
   authenticating a user,
   capturing an image signal with the camera of the terminal,
   performing a face detection process with the captured image signal,
   determining the number of faces in the captured image signal, and
   granting unlimited access responsive to a successful authentication and a determination that the number of faces is exactly one.

4. The method according to claim 3, wherein the authentication comprises biometric authentication.

5. The method according to claim 4, wherein the authentication comprises face identification and/or iris identification.

6. A computer program product stored on a non-transitory computer readable medium that when executed by a computer performs a method for access control of the computer comprising:
   displaying a visual indication of unlimited access during unlimited access;
   capturing an image signal with a camera of the computer;
   performing a face detection process with the captured image signal;
   determining a number of faces detected in the captured image signal during the face detection process;
   limiting access to private data stored by the computer responsive to determining that the number of faces is greater than one; and
   hiding the visual indication of unlimited access during limited access,
   wherein the private data are fully hidden during limited access and only the other data are displayed.

* * * * *